(12) United States Patent
Hanada et al.

(10) Patent No.: US 6,565,795 B1
(45) Date of Patent: May 20, 2003

(54) PROCESS FOR PRODUCING A THERMOPLASTIC RESIN-MOLDED ARTICLE

(75) Inventors: Satoshi Hanada, Ibaraki (JP); Nobuhiro Usui, Takatsuki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 93 days.

(21) Appl. No.: 09/694,346

(22) Filed: Oct. 24, 2000

(30) Foreign Application Priority Data

Oct. 26, 1999 (JP) .............................. 11-303956

(51) Int. Cl.$^7$ .............................................. B29C 45/14
(52) U.S. Cl. ..................... 264/554; 264/259; 264/321; 264/510; 264/553
(58) Field of Search ................................ 264/259, 321, 264/510, 553, 554

(56) References Cited

U.S. PATENT DOCUMENTS 5,281,376 A * 1/1994 Hara et al. .................. 264/46.4
5,360,829 A * 11/1994 Kawabe et al. .............. 521/81
5,401,456 A * 3/1995 Alesi, Jr. et al. ............ 264/321
6,056,531 A * 5/2000 Furuya et al. ............... 264/154

OTHER PUBLICATIONS

Abstract of Japan of JP–A–S56–117639 A, Sep. 16, 1981.
Abstract of Japan of JP–A–S56–118835 A, Sep. 18, 1981.

* cited by examiner

*Primary Examiner*—Allan R. Kuhns
(74) *Attorney, Agent, or Firm*—Fitch, Even, Tabin & Flannery

(57) ABSTRACT

The present invention provides a thermoplastic resin-molded article comprising a thermoplastic resin functional member fused partially to a foamed sheet made of thermoplastic resin shaped in a predetermined form, as well as a process for producing the same. The thermoplastic molded article is preferably used mainly as an interior part in automobiles. According to the present invention, thermoplastic resin molded articles having less variability of the drawing strength of thermoplastic resin functional members from thermoplastic resin foamed sheets can be provided, and these used in interior parts in automobiles. Such molded articles made of thermoplastic resin can be produced efficiently according to the process of the present invention.

4 Claims, 4 Drawing Sheets

PROCESS FOR PRODUCING A THERMOPLASTIC RESIN-MOLDED ARTICLE

BACKGROUND OF THE INVENTION

1. Field of the Invention

The present invention relates to a thermoplastic resin-molded article comprising a thermoplastic resin functional member fused partially to a foamed sheet made of thermoplastic resin, as well as a process for producing the same. The thermoplastic molded article is preferably used mainly as an interior part in automobiles.

2. Description of the Related Art

Heretofore, a wide variety of articles having a thermoplastic resin member attached through fusion or adhesion to a non-foamed sheet made of thermoplastic resin have been known.

However, such conventional articles have the problem of significant variability of the drawing strength of the thermoplastic resin member from the non-foamed sheet made of thermoplastic resin.

SUMMARY OF THE INVENTION

The object of the present invention is to provide a thermoplastic resin-molded article excellent in uniformity of drawing strength comprising a thermoplastic resin sheet provided with a functional member made of thermoplastic resin, as well as a process for efficiently producing the same.

The present inventors made extensive study for solving the problem of the prior art described above, and they have found that a thermoplastic resin-molded article comprising a thermoplastic resin functional member fused partially to a foamed sheet made of thermoplastic resin shaped in a predetermined form shows lower variability of the drawing strength of the functional member from the foamed sheet made of thermoplastic resin, as well as a process for efficiently producing the same, thus arriving at the present invention.

That is, the present invention provides a thermoplastic resin-molded article comprising a thermoplastic resin functional member fused partially to a foamed sheet made of thermoplastic resin shaped in a predetermined form. The thermoplastic resin-molded article thus constituted is excellent in uniformity of the drawing strength of the functional member from the foamed sheet made of thermoplastic resin, and further the functional member is fused without an adhesive to the foamed sheet made of thermoplastic resin, and thus this article has a less influence on the human body and environment.

In addition, the present invention provides a process for producing the above-described thermoplastic resin-molded article, comprising the following steps:

(1) feeding a foamed sheet made of thermoplastic resin shaped in a predetermined form into between a pair of male and female mold halves, at least one mold half having in the molding surface a concave portion corresponding to the shape of the functional member;

(2) closing the mold halves, to stop the opening of said concave portion with the foamed sheet made of thermoplastic resin;

(3) feeding thermoplastic resin in a molten state to said concave portion through a resin passageway leading to said concave portion and provided in the mold halves, while the mold halves are closed to stop the opening of the concave portion with the foamed sheet made of thermoplastic resin, to fuse the thermoplastic resin integrally to the foamed sheet made of thermoplastic resin to form a thermoplastic resin-molded article; and (4) cooling the thermoplastic resin-molded article formed in step (3) and removing it from the mold halves.

In addition, the present invention also provided a process for producing the above-described thermoplastic resin-molded article, comprising the following steps:

(1) heating and softening a foamed sheet made of thermoplastic resin;

(2) feeding the foamed sheet made of thermoplastic resin softened in step (1) into between a pair of male and female mold halves having a molding portion for shaping the thermoplastic resin foamed sheet, at least one mold half having in the molding surface a concave portion corresponding to the shape of the functional member;

(3) closing the mold halves, to shape the foamed sheet made of thermoplastic resin in a predetermined form;

(4) feeding thermoplastic resin in a molten state to said concave portion through a resin passageway leading to said concave portion and provided in the mold halves, while the mold halves are closed to stop the opening of the concave portion with the foamed sheet made of thermoplastic resin shaped in step (3), to fuse the thermoplastic resin integrally to the foamed sheet made of thermoplastic resin to form a thermoplastic resin-molded article; and (5) cooling the thermoplastic resin-molded article formed in step (4) and removing it from the mold halves.

In addition, the present invention further provided a process for producing the above-described thermoplastic resin-molded article, comprising the following steps:

(1) heating and softening a foamed sheet made of thermoplastic resin;

(2) shaping the foamed sheet made of thermoplastic resin softened in step (1) in a predetermined shape by vacuum forming, pressure forming or vacuum pressure forming by use of either male mold half or female mold half or a pair of male and female mold halves having a molding portion for shaping the thermoplastic resin foamed sheet, at least one mold half having in the molding surface a concave portion corresponding to the shape of the functional member;

(3) feeding thermoplastic resin in a molten state to said concave portion through a resin passageway leading to said concave portion and provided in the mold halves, while the mold halves are closed to stop the opening of the concave portion with the foamed sheet made of thermoplastic resin shaped in step (2), to fuse the thermoplastic resin integrally to the foamed sheet made of thermoplastic resin to form a thermoplastic resin-molded article; and (4) cooling the thermoplastic resin-molded article formed in step (3) and removing it from the mold halves.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE PREFERRED EMBODIMENTS

Figure 1:
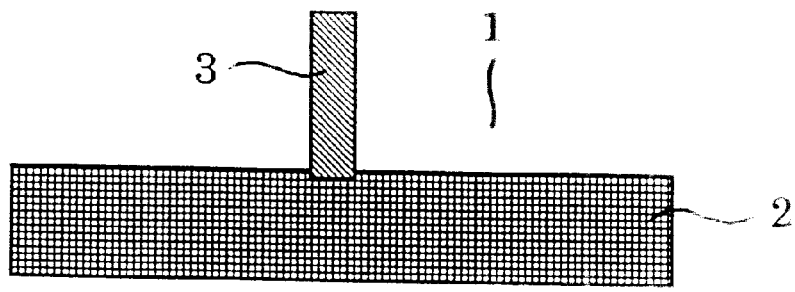
FIG. 1 shows an example of the thermoplastic resin-molded article of the present invention.
Figure 2:
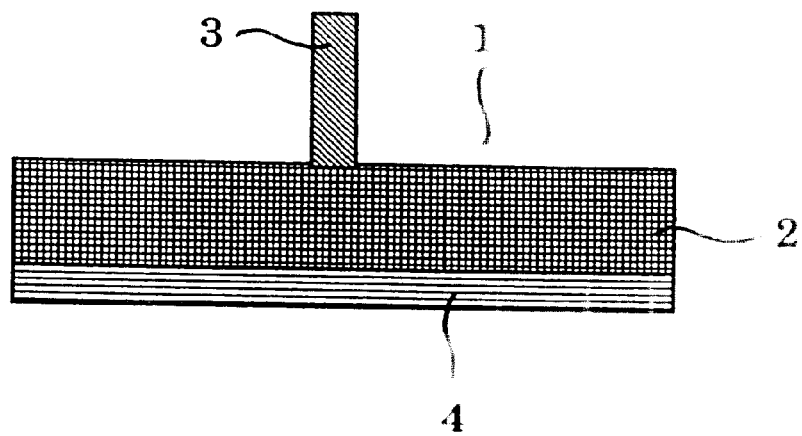
FIG. 2 shows an example of the thermoplastic resin-molded article of the present invention.

The thermoplastic resin constituting a foamed sheet made of thermoplastic resin in the thermoplastic resin-molded article of the present invention (also referred to hereinafter as "the molded article of the present invention") can be selected from a wide variety of thermoplastic resin as necessary, depending on the type of thermoplastic resin constituting a functional member fused to the foamed sheet. The foamed sheet made of thermoplastic resin may be made of one kind of thermoplastic resin or two or more kinds of thermoplastic resin. The thermoplastic resin preferably used includes polyethylene-based resin, polypropylene-based resin, polystyrene-based resin, polyethylene terephthalate-based resin, polyvinyl alcohol-based resin, vinyl chloride-based resin, ionomer-based resin, acrylonitrile/butadiene/styrene resin (ABS resin) etc.

Among the thermoplastic resins described above, the polypropylene-based resin is preferable for the aspect of heat resistance etc. The preferable polypropylene-based resin includes e.g. a homopolymer of propylene and a copolymer containing at least 50 mole % propylene unit. Preferable components copolymerizable with propylene in said copolymer include e.g. ethylene and α-olefin. The α-olefin includes e.g. $C_{4-10}$ α-olefins such as 1-butene, 4-methylpentene-1,1-hexene, and 1-octene. The content of monomer units other than propylene in said copolymer is preferably that ethylene is 10 % by weight or less and α-olefin is 30 % by weight or less.

As the polypropylene-based resin, a polypropylene resin into which branched long chains were introduced via cross-linkage by electron beams at low levels, as disclosed in JP-A 62-121704, is also preferable. Further, a polypropylene resin into which an ultra-high-molecular component was introduced is also used preferably.

The magnification of foaming of the foamed sheet made of thermoplastic resin is not particularly limited, but in consideration of the balance between the weight and strength of the product, a magnification of foaming of 2 to 10 is preferable. The diameter of a cell in the foamed sheet made of thermoplastic resin is preferably in the range of 2 mm to 0.1 μm, more preferably in the range of 500 μm to 10 μm from the viewpoint of the strength and workability of the foamed sheet. The thickness of the foamed sheet made of thermoplastic resin is preferably 0.5 mm to 100 mm, more preferably 1 mm to 10 mm from the viewpoint of the strength and handling of the sheet. In view of its influence on the human body, environment etc., the foamed sheet made of thermoplastic resin is preferably the one produced by use of carbon dioxide as a foaming agent.

The functional member made of thermoplastic resin in the molded article of the present invention is formed so as to be protruded from the foamed sheet made of thermoplastic resin. Examples of such functional members include a rib having a function of reinforcing the foamed sheet made of thermoplastic resin, as well as members such as boss, clip and hook having a function of attaching the foamed sheet made of thermoplastic resin to other members.

The thermoplastic resin constituting the functional member may be selected from a wide variety of thermoplastic resin as necessary, depending on the type of thermoplastic resin constituting the foamed sheet made of thermoplastic resin for fusing the functional member. Examples of resin which can be ordinarily preferably used include polyethylene-based resin, polypropylene-based resin, polystyrene-based resin, polyethylene terephthalate-based resin, polyvinyl alcohol-based resin, vinyl chloride-based resin, ionomer-based resin, polyamide-based resin, acrylonitrile/butadiene/styrene resin (ABS resin), polycarbonate resin, modified products thereof, and a polymer alloy made of two or more resins. The functional member may be constituted of one kind of thermoplastic resin or two or more kinds of thermoplastic resin. The thermoplastic resin constituting the functional member is preferably a thermoplastic resin compatible with the thermoplastic resin of the foamed sheet, from the viewpoint of the strength of fusing to the foamed sheet made of thermoplastic resin.

A wide variety of fillers (e.g. inorganic fibers such as glass fiber, carbon fiber etc., and inorganic particles such as talk, clay, silica, calcium carbonate etc.) may have been incorporated into the thermoplastic resin constituting the functional member. In addition, various kinds of additives such as an antioxidant, an UV absorber, a coloring agent, a flame retardant and a low-shrinkage agent may have been incorporated as necessary.

In the molded article of the present invention, the functional member may have been attached to only one side of the foamed sheet made of thermoplastic resin or to both sides of the foamed sheet. The position where the functional member is attached, or the number of members attached, is not particularly limited.

In the molded article of the present invention, the foamed sheet made of thermoplastic resin may have been provided thereon with a skin material. Such a skin material is arranged on the surface of the thermoplastic resin-foamed sheet, to work for decoration, reinforcement, protection etc. The skin material includes woven fabric, non-woven fabric, knitted cloth, sheet, film, foam and reticulated material. Materials constituting such skin materials are not particularly limited, and examples include thermoplastic resin such as polyolefin-based resin, polyvinyl chloride-based resin and polystyrene-based resin, thermosetting resin such as polyurethane-based resin, rubber and thermoplastic elastomer such as cis-1,4-polybutadiene and ethylene/propylene copolymers, and natural fibers such as cellulose-based fibers e.g. cotton, hemp and bamboo. Further, paper, metal foil etc. can also be used as the skin material. Such skin material may have been subjected to embossing for uneven patterns, printing or coloring. The skin material may have a single-ply structure or a multi-ply structure consisting of 2 or more layers.

Figure 3:
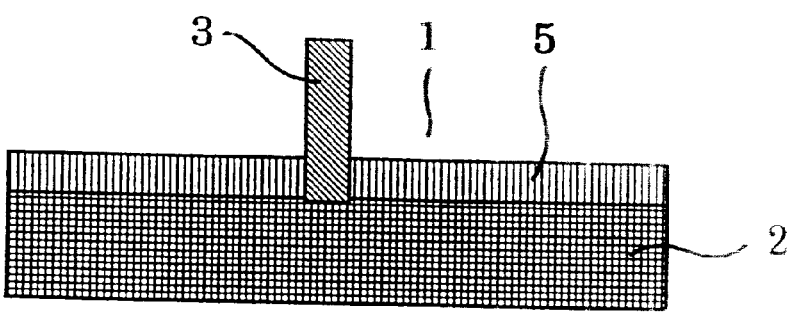
FIG. 3 shows an example of the thermoplastic resin-molded article of the present invention.
Figure 4:
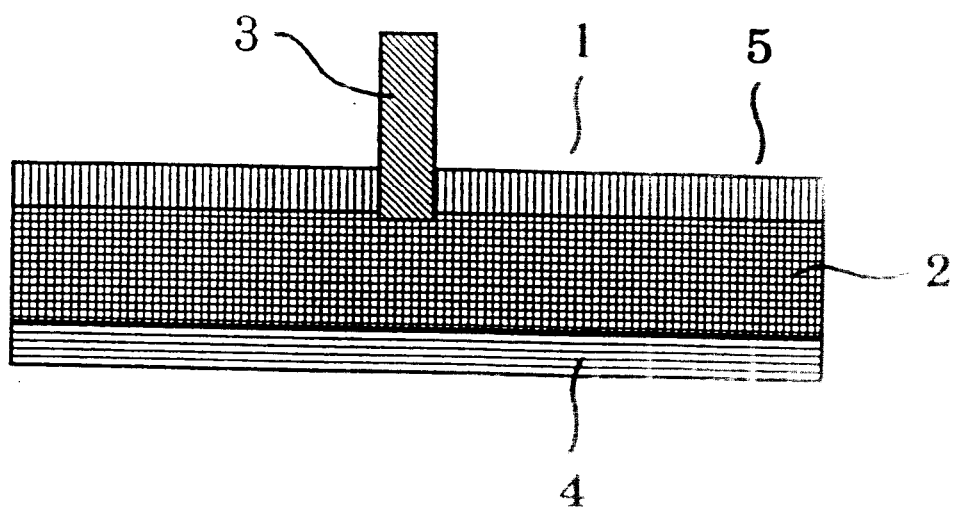
FIG. 4 shows an example of the thermoplastic resin-molded article of the present invention.
Figure 5:
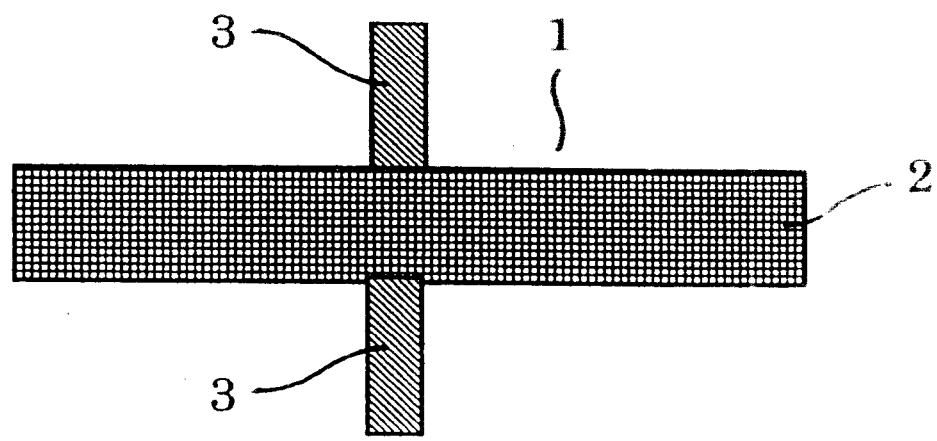
FIG. 5 shows an example of the thermoplastic resin-molded article of the present invention.

The molded article of the present invention may be constituted such that the functional member is fused via a porous layer arranged on one or both sides of the foamed sheet made of thermoplastic resin, to the foamed sheet of thermoplastic resin. Such constitution is particularly advantageous when cells in the foamed sheet made of thermoplastic resin collapse easily, or at the time of shaping the thermoplastic resin-molded article subjected to the conditions for feeding thermoplastic resin in a molten state via a resin passageway provided in mold halves to a concave portion. The shape of the porous layer is not particularly limited insofar as the functional member can be fused through the porous layer to the foamed sheet made of thermoplastic resin, and in the porous layer, woven fabric, non-woven fabric, reticulated materials, and foam having continuous holes may be used among which non-woven fabric is preferably used. Examples of materials constituting the porous layer include thermoplastic resin such as polyolefin-based resin, polyester-based resin, polyvinyl chloride-based resin and polystyrene-based resin, thermoplastic resin containing fine inorganic particles, natural fibers such as cotton, hemp and bamboo, metal and minerals FIGS. 1 to 5 show an example of the thermoplastic resin-molded article 1 comprising the functional member 3 made of thermoplastic resin fused partially to the foamed sheet 2 made of thermoplastic resin. The thermoplastic resin-molded article 1 shown in FIG. 1 consists of the foamed sheet 2 made of thermoplastic resin and the functional member 3. The thermoplastic resin-molded article 1 shown in FIG. 2 has the skin material 4 on the surface of the foamed sheet 2 made of thermoplastic resin. FIG. 3 shows the thermoplastic resin-molded article 1 having the functional member 2 fused via the porous layer 5 to the foamed sheet 2 made of thermoplastic resin. FIG. 4 shows the thermoplastic resin-molded article 1 having the function member 3 fused via the porous layer 5 to the foamed sheet 2 made of thermoplastic resin having the skin material 4 thereon. FIG. 5 shows the thermoplastic resin-molded article 1 having the functional member 3 fused to both sides of the foamed sheet 2 made of thermoplastic resin.

In the molded article of the present invention, a thermoplastic resin functional member such as a rib for reinforcement, or a boss, a clip or a hook which is a fixture for fixing the article to other parts is fused to a part of the foamed sheet made of thermoplastic resin, so the molded article of the present invention can be used as an interior part in automobiles, such as ceiling and doors in automobiles.

The molded article may be produced efficiently according to the process described below. The first process is a process comprising a combination of the following steps:

(1) feeding a foamed sheet made of thermoplastic resin shaped in a predetermined form into between a pair of male and female mold halves, at least one mold half having in the molding surface a concave portion corresponding to the shape of the functional member;

(2) closing the mold halves, to stop the opening of said concave portion with the foamed sheet made of thermoplastic resin;

(3) feeding thermoplastic resin in a molten state to said concave portion through a resin passageway leading to said concave portion and provided in the mold halves, while the mold halves are closed to stop the opening of the concave portion with the foamed sheet made of thermoplastic resin, to fuse the thermoplastic resin integrally to the foamed sheet made of thermoplastic resin to form a thermoplastic resin-molded article; and (4) cooling the thermoplastic resin-molded article formed in step (3) and removing it from the mold halves.

In this process, a foamed sheet made of thermoplastic resin previously shaped in a predetermined form by arbitrary techniques such as pressing, vacuum forming, pressure forming and vacuum pressure forming may be used. Further, a foamed sheet made of thermoplastic resin having a skin materials and/or a porous layer may also be used.

In this process, a pair of male and female mold halves is used. At least one mold half is provided with concave portion(s) whose number and shape correspond to the number and shape of functional member(s) to be formed. Insofar as the design of the article permits, the opening of the concave portion is preferably broad and tapered to narrow its bottom, in order to remove the article easily from the mold half. At least one mold half is provided at the concave portion thereof with a resin passageway for feeding thermoplastic resin for forming the functional member.

The arrangement of the concave portion and resin passageway described here applies to the mold halves used in the two processes described below.

In step (2), the mold halves are closed to stop the opening of the concave portion with the foamed sheet made of thermoplastic resin in order to conduct step (3) subsequently.

In step (3), the thermoplastic resin is fed in a molten state to said concave portion while the mold halves are closed to stop the opening of the concave portion with the foamed sheet made of thermoplastic resin in order to prevent the thermoplastic resin fed to the concave portion from being leaked from the concave portion, and then the thermoplastic resin is fused integrally to the foamed sheet made of thermoplastic resin.

In step (4), the functional member in the thermoplastic resin-molded article formed in step (3) is cooled and solidified, and the molded article is removed from the mold halves.

The second process is a process comprising a combination of the following steps:

(1) heating and softening a foamed sheet made of thermoplastic resin;

(2) feeding the foamed sheet made of thermoplastic resin softened in step (1) into between a pair of male and female mold halves having a molding portion for shaping the thermoplastic resin foamed sheet, at least one mold half having in the molding surface a concave portion corresponding to the shape of the functional member;

(3) closing the mold halves, to shape the foamed sheet made of thermoplastic resin in a predetermined form;

(4) feeding thermoplastic resin in a molten state to said concave portion through a resin passageway leading to said concave portion and provided in the mold halves, while the mold halves are closed to stop the opening of the concave portion with the foamed sheet made of thermoplastic resin shaped in step (3), to fuse the thermoplastic resin integrally to the foamed sheet made of thermoplastic resin to form a thermoplastic resin-molded article; and (5) cooling the thermoplastic resin-molded article formed in step (4) and removing it from the mold halves.

In the third process is a process comprising a combination of the following steps:

(1) heating and softening a foamed sheet made of thermoplastic. resin;

(2) shaping the foamed sheet made of thermoplastic resin softened in step (1) in a predetermined shape by vacuum forming, pressure forming or vacuum pressure forming by use of either male mold half or female mold half or a pair of male and female mold halves having a molding portion for shaping the thermoplastic resin foamed sheet, at least one mold half having in the molding surface a concave portion corresponding to the shape of the functional member;

(3) feeding thermoplastic resin in a molten state to said concave portion through a resin passageway leading to said concave portion and provided in the mold halves, while the mold halves are closed to stop the opening of the concave portion with the foamed sheet made of thermoplastic resin shaped in step (2), to fuse the thermoplastic resin integrally to the foamed sheet made of thermoplastic resin to form a thermoplastic resin-molded article; and (4) cooling the thermoplastic resin-molded article formed in step (3) and removing it from the mold halves.

In the second and third processes, the foamed sheet made of thermoplastic resin is softened in step (1) by heating it with a suitable heating means. For heating, for example an infrared heater, an oven etc. may be used. The heating temperature of the foamed sheet is varied depending on its material, and for example in the case of the foamed sheet made of polypropylene, it is heated preferably at about 130 to 160° C.

In step (2) in the second process, the thermoplastic resin foamed sheet softened in step (1) is fed into between a pair of male and female mold halves having a molding portion for shaping the thermoplastic resin foamed sheet, at least one mold half having in the molding surface a concave portion for forming the functional member. In step (3), the mold halves are closed so that the softened foamed sheet made of thermoplastic resin is shaped in a predetermined form. Usually, at least one of the male and female mold halves is connected to a drive so as to be movable, and after the softened foamed sheet was fed between the mold halves in step (2), both the mold halves approach each other thereby pressing and shaping the foamed sheet.

In step (2) in the third process, the thermoplastic resin foamed sheet softened in step (1) is shaped in a predetermined form by vacuum forming, pressure forming or vacuum pressure forming by means of mold halves having a molding portion for shaping the thermoplastic resin foamed sheet and having a concave portion for forming the functional member in said molding portion. Vacuum forming, pressure forming or vacuum pressure forming may be conducted in a usual manner by use of either male mold half or female mold half or a pair of male and female mold halves, and as necessary, an auxiliary member for achieving an air-tight state may be used in combination with the mold halves. In step (2) in the third process, a suction mechanism and/or an intake (compressing or pressurizing) mechanism provided in the molding device including the mold halves are allowed to work as necessary depending on the molding process (that is, vacuum forming, pressure forming or vacuum pressure forming), whereby the foamed sheet made of thermoplastic resin is shaped.

In step (4) in the second process and in step (3) in the third process, while the opening of the functional member-forming concave portion in the mold half used in shaping of the foamed sheet made of thermoplastic resin is stopped with the foamed sheet made of thermoplastic resin shaped in the previous step, thermoplastic resin is fed in a molten state to said concave portion and fused integrally to the foamed sheet made of thermoplastic resin with which the opening of the concave portion is stopped. In the second process, this step is conducted while the mold halves are closed.

In step (5) in the second process and in step (4) in the third process, the functional member of the thermoplastic resin-molded article thus molded is cooled and solidified, and then the molded article is removed from the mold halves.

By use of the foamed sheet made of thermoplastic resin having a skin material and/or a porous layer in the second and third processes, a molded article having the skin material on the surface of the foamed sheet made of thermoplastic resin, or a molded article having the functional member fused via the porous layer to the foamed sheet made of thermoplastic resin, can also be obtained. In step (2) in the second process, the same molded article as above can be obtained by feeding a skin material and/or a porous layer, along with the foamed sheet made of thermoplastic resin, between the mold halves.

As compared with the method of bonding the functional member via an adhesive to the foamed sheet made of thermoplastic resin, the second and third processes are effective because the shaping of the thermoplastic resin foamed sheet, the molding of the functional member and the fusion of the functional member to the foamed sheet can be practiced in a series of steps, thus reducing the production costs of the molded article. Further, because no adhesive is used, there is a less influence on the human body and environment.

When a molded article having a plurality of functional members having volumes different from one another is produced in the 3 processes described above, that is, when a mold half having a plurality of concave portions having volumes different from one another is used, a mechanism of permitting the resin-feeding openings of the respective concave portions to be opened or closed independently of one another, thus suitably adjusting the timing of the opening and closing of the respective resin-feeding openings, whereby all the concave portions can be filled with suitable amounts of thermoplastic resin.

One example of the second process is described by reference to FIGS. 6 to 9.

Figure 6:
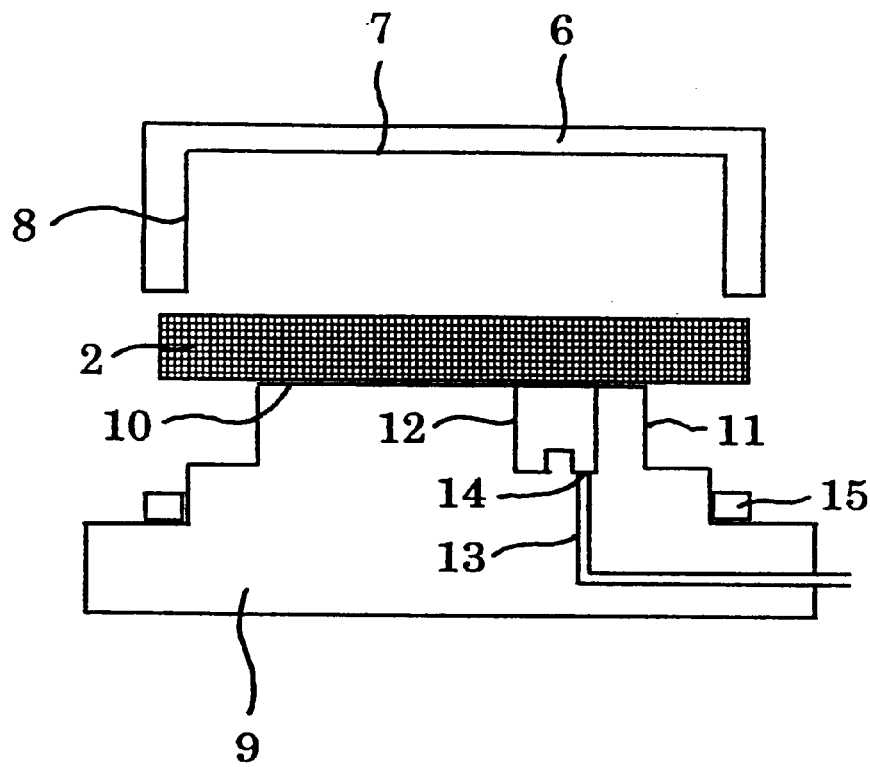
FIG. 6 is a sectional drawing showing that in one embodiment of the process of the present invention, a softened foamed sheet of thermoplastic resin is placed on the surface of the molding surface of a male mold half.

In FIG. 6, the female mold half 6 is attached to a platen on a pressing machine (not shown) moving vertically, and has the molding surface 7 of the female mold half and the internal peripheral surface 8 of the female mold half. The male mold half 9 is attached to a platen (not shown) fixed to a pressing machine, and has the molding surface 10 of the male mold half and the external peripheral surface 11 of the male mold half sliding against the internal peripheral surface 8 of the female mold half. The male mold half 9 is provided with the concave portion 12 for forming the functional member (clip). Further, the male mold half is provided with the resin passageway 13 for feeding thermoplastic resin in a molten state to the concave portion 12. The thermoplastic resin in a molten state is fed via the resin passageway 13, through the resin-feeding opening 14, to the concave portion 12. One end of the resin passageway is connected to a resin feeder (not shown) for feeding the thermoplastic resin in a molten state to the resin passageway. The external peripheral portion of the male mold half 9 is provided with the stopper 15 for determining the lowest position for downward movement of the female mold half 6.

Figure 7:
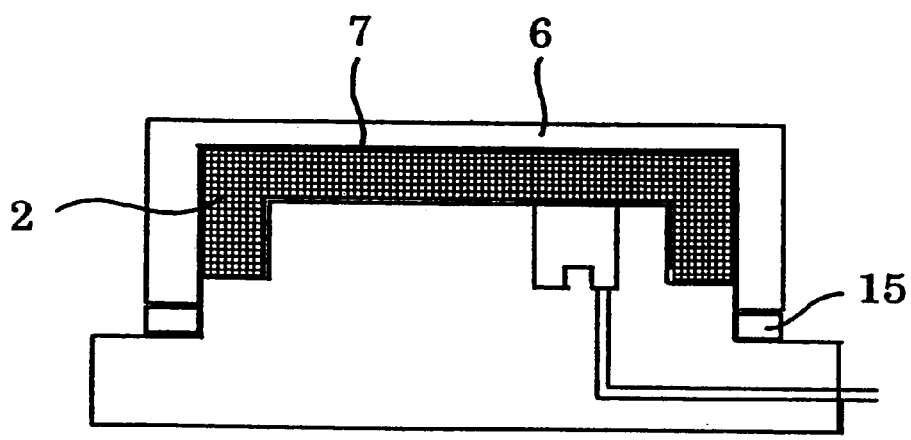
FIG. 7 is a sectional drawing showing that in one embodiment of the process of the present invention, the downward movement of a female mold half is finished, and a thermoplastic resin in a molten state is fed to a concave portion.

Though not shown, an oven is used to heat and soften the foamed sheet made of thermoplastic resin. Then, as shown in FIG. 6, the softened foamed sheet 2 of thermoplastic resin is placed on the molding surface 10 of the male mold half. Then, as shown in FIG. 7, the female mold half 6 is lowered until the bottom of the female mold half 6 is brought into contact with the stopper 15. By downward movement of the female mold half 6, the foamed sheet 2 of thermoplastic resin is shaped by compression with the molding surface 7 of the female mold half and the molding surface 10 of the male mold half.

Figure 8:
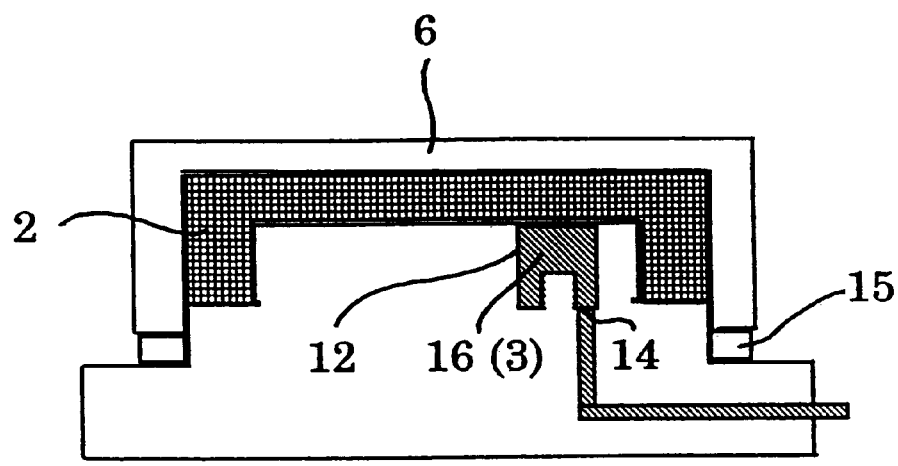
FIG. 8 is a sectional drawing showing that in one embodiment of the process of the present invention, the thermoplastic resin in a molten state fed to the concave portion has been fused integrally to the foamed sheet made of thermoplastic resin.
Figure 9:
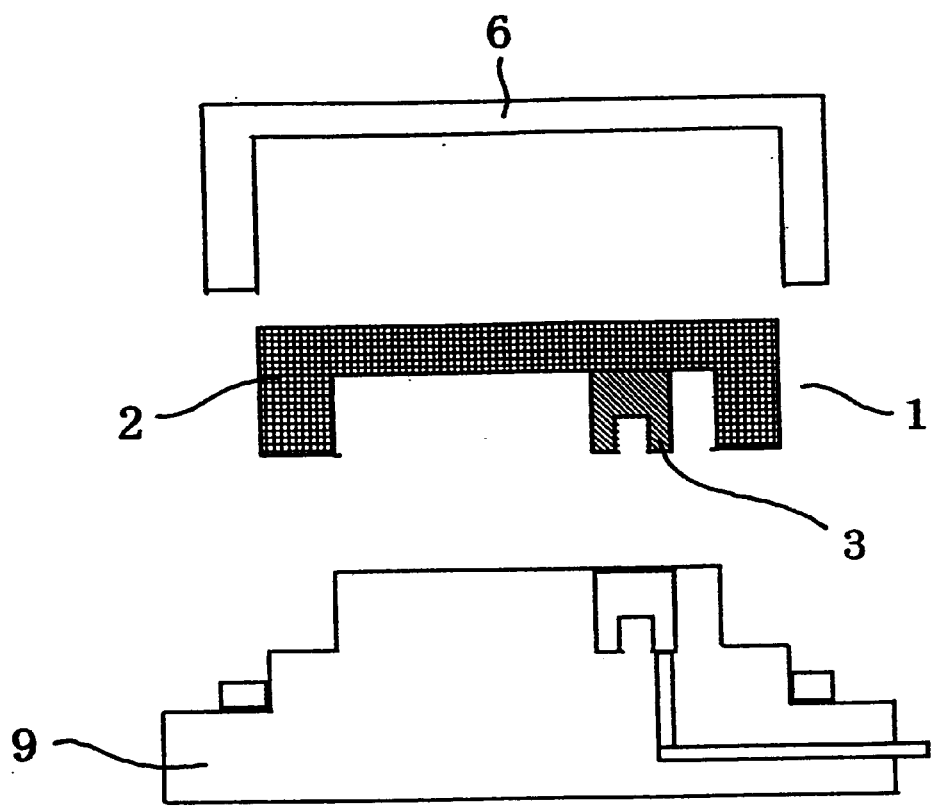
FIG. 9 is a sectional drawing showing that in one embodiment of the process of the present invention, the thermoplastic resin-molded article is removed from the mold halves.

As shown in FIG. 8, when or immediately after the female mold half 6 is brought into contact with the stopper 15, a predetermined amount of thermoplastic resin 16 in a molten state is fed via the resin-feeding opening 14 to the concave portion 12, to form a clip having a predetermined form fused integrally to the foamed sheet 2 of thermoplastic resin. A thermoplastic resin-molded article is thereby formed. Thereafter, the thermoplastic resin-molded article 1 is removed by opening the mold halves, as shown in FIG. 9.

According to the present invention, thermoplastic resin molded articles having less variability of the drawing strength of thermoplastic resin functional members from thermoplastic resin foamed sheets can be provided, and these used in interior parts in automobiles. Such molded articles made of thermoplastic resin can be produced efficiently according to the process of the present invention.

EXAMPLES

Hereinafter, the present invention is described in more detail by reference to the Examples, which however are not intended to limit the present invention.
Measurement of Drawing Strength Autograph DSS2000 (Shimadzu Corp., JP) was used as an autographic recording device. First, a thermoplastic resin-molded article was fixed to a clump attached to a vertically movable bar in the autographic recording device, and then a clip fused to a thermoplastic resin foamed sheet in said molded article was attached to the top of a bar-shaped jig fixed to a load cell in the autographic recording device. Then, the load cell was drawn at a drawing rate of 2 mm/min. until said clip was removed from the thermoplastic resin foamed sheet, and the peak value of the drawing strength in this drawing step was measured. 10 thermoplastic resin-molded articles prepared under the same conditions were also measured in the same manner, and the variability of the drawing strength was evaluated in terms of the difference between the maximum and minimum peak values thus obtained.

Example 1

A pair of male and female mold halves (size of the molding surface: length, 300 mm; width, 300 mm) among which the male mold half (lower mold half) had one concave portion for forming a clip was used. A foamed sheet made of polypropylene (Sumicellar Foamed PP Sheet™ with a magnification of foaming of 3, a length of 300 mm, a width of 300 mm and a thickness of 2 mm, Sumitomo Chemical Co., Ltd.) was heated at 130° C. in an oven and placed on the molding surface of the male mold half. The female mold half (upper mold half) was lowered until the distance between the molding surfaces of the male and female mold halves became 2 mm. When the downward movement of the female mold half was finished, thermoplastic resin in a molten state (240° C.) was fed to the concave portion through a resin passageway provided in the male mold half. As the thermoplastic resin, Sumitomo Nobrene AX568 (polypropylene with a melt index of 65 g/10 min., Sumitomo Chemical Co., Ltd.) was used. The temperature of the molding surfaces of the male and female mold halves was set at 30° C. and the pressing pressure at 3.9 MPa. As a result, a molded article having a clip fused to the foamed sheet was obtained.

Ten molded articles, which were prepared in the method described above, were measured for the peak value of the drawing strength of the clip portion in order to evaluate the variability of the drawing strength. The results are shown in Table 1.

Example 2

A molded article having a clip fused via a non-woven fabric to a foamed sheet was obtained in the same manner as in Example 1 except that a foamed sheet made of polypropylene (Sumicellar Foamed PP Sheet™ with a magnification of foaming of 3, a length of 300 mm, a width of 300 mm and a thickness of 2 mm, Sumitomo Chemical Co., Ltd.) having a non-woven fabric made of polypropylene applied onto one side thereof (application amount, 110 g/m$^2$) was used in place of the propylene foamed sheet used in Example 1, and this foamed sheet was placed so that the non-oven fabric faced on the molding surface of the male mold half.

Ten molded articles prepared in the method described above were measured for the peak value of the drawing strength of the clip portion, to evaluate the variability of the drawing strength. The results are shown in Table 1.

Comparative Example 1

A molded article having a clip fused to a non-foamed sheet was obtained in the same manner as in Example 1 except that a non-foamed sheet (thickness, 4 mm; density, 0.9 g/cm$^3$) consisting of polypropylene (Sumitomo Nobrene S6002D with a melt index of 6 g/10 minutes, Sumitomo Chemical Co., Ltd.) was used in place of the polypropylene foamed sheet used in Example 1, and the female mold half was lowered until the distance between the molding surfaces of the male and female mold halves reached 4 mm.

Ten molded articles prepared in the method described above were measured for the peak value of the drawing strength of the clip portion, to evaluate the variability of the drawing strength. The results are shown in Table 1.

TABLE 1

|  | Example 1 | Example 2 | Comparative Example 1 |
|---|---|---|---|
| Thermoplastic resin sheet | PP foamed sheet | PP foamed sheet | PP non-foamed sheet |
| Sheet thickness | 2 mm | 2 mm | 4 mm |
| Porous layer | none | non-woven polypropylene fabric | none |
| Variability of drawing strength | 0.4 kg | 0.3 kg | 1.1 kg |

What is claimed is:

1. A process for producing a thermoplastic resin-molded article comprising a thermoplastic resin functional member fused partially to a foamed sheet made of thermoplastic resin shaped in a predetermined form, comprising the following steps:

(1) feeding a foamed sheet made of thermoplastic resin shaped in a predetermined form into a space between a pair of male and female mold halves, at least one mold half having in the molding surface a concave portion corresponding to the shape of the functional member;

(2) closing the mold halves, to seal the opening of said concave portion with the foamed sheet made of thermoplastic resin;

(3) after step (2), feeding thermoplastic resin in a molten state to said concave portion through a resin passageway leading to said concave portion and provided in the mold halves, while the mold halves are kept closed to seal the opening of the concave portion with the foamed sheet made of thermoplastic resin, to fuse the thermoplastic resin integrally to the foamed sheet made of thermoplastic resin to form a thermoplastic resin-molded article; and (4) cooling the thermoplastic resin-molded article formed in step (3) and removing it from the mold halves.

2. A process for producing a thermoplastic resin-molded article comprising a thermoplastic resin functional member fused partially to a foamed sheet made of thermoplastic resin shaped in a predetermined form, comprising the following steps:

(1) heating and softening a foamed sheet made of thermoplastic resin;

(2) feeding the foamed sheet made of thermoplastic resin softened in step (1) into a space between a pair of male and female mold halves having a molding portion for shaping the thermoplastic resin foamed sheet, at least one mold half having in the molding surface a concave portion corresponding to the shape of the functional member;

(3) closing the mold halves, to shape the foamed sheet made of thermoplastic resin into a predetermined form and seal the opening of the concave portion with the foamed sheet;

(4) after step (3), feeding thermoplastic resin in a molten state to said concave portion through a resin passageway leading to said concave portion and provided in the mold halves, while the mold halves are kept closed to seal the opening of the concave portion with the foamed sheet made of thermoplastic resin shaped in step (3), to fuse the thermoplastic resin integrally to the foamed sheet made of thermoplastic resin to form a thermoplastic resin-molded article; and (5) cooling the thermoplastic resin-molded article formed in step (4) and removing it from the mold halves.

3. A process for producing a thermoplastic resin-molded article comprising a thermoplastic resin functional member fused partially to a foamed sheet made of thermoplastic resin shaped in a predetermined form, comprising the following steps:

(1) heating and softening a foamed sheet made of thermoplastic resin;

(2) shaping the foamed sheet made of thermoplastic resin softened in step (1) in a predetermined shape by vacuum forming, pressure forming or vacuum pressure forming by use of either a male mold half or a female mold half or a pair of male and female mold halves having a molding portion for shaping the thermoplastic resin foamed sheet, at least one mold half having in the molding surface a concave portion corresponding to the shape of the functional member;

(3) closing the mold halves to seal the opening of the concave portion with the foamed sheet;

(4) after step (3), feeding thermoplastic resin in a molten state to said concave portion through a resin passageway leading to said concave portion and provided in the mold halves, while the mold halves are kept closed to seal the opening of the concave portion with the foamed sheet made of thermoplastic resin shaped in step (2), to fuse the thermoplastic resin integrally to the foamed sheet made of thermoplastic resin to form a thermoplastic resin-molded article; and (5) cooling the thermoplastic resin-molded article formed in step (4) and removing it from the mold halves.

4. The process according to any one of claims 1 to 3, wherein the thermoplastic resin foamed sheet used has a skin material and/or a porous layer.

* * * * *